(12) United States Patent
Japs

(10) Patent No.: US 12,305,696 B2
(45) Date of Patent: May 20, 2025

(54) JOINING ARRANGEMENT HAVING A RECEIVING MEANS AND A BALL JOINT

(71) Applicant: HELLA GmbH & Co. KG, Lippstadt (DE)

(72) Inventor: Eduard Japs, Herford (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 502 days.

(21) Appl. No.: 17/866,229

(22) Filed: Jul. 15, 2022

(65) Prior Publication Data

US 2022/0349441 A1    Nov. 3, 2022

Related U.S. Application Data

(63) Continuation of application No. PCT/EP2021/050120, filed on Jan. 6, 2021.

(30) Foreign Application Priority Data

Jan. 16, 2020  (DE) ..................... 10 2020 100 918.6

(51) Int. Cl.
 *F16C 11/06*  (2006.01)
(52) U.S. Cl.
 CPC ................ *F16C 11/0623* (2013.01)
(58) Field of Classification Search
 CPC ........ B60Q 1/04; B60Q 1/06; B60Q 2200/32; Y10T 403/32631; Y10T 403/32811; Y10T 403/32688; Y10T 403/32786
 See application file for complete search history.

(56) References Cited

U.S. PATENT DOCUMENTS

| | | | | |
|---|---|---|---|---|
| 3,853,414 A | * | 12/1974 | Hirano | F16C 11/0657 403/349 |
| 4,380,860 A | * | 4/1983 | Riester | F16C 11/0657 384/220 |
| 5,743,618 A | * | 4/1998 | Fujino | B60Q 1/0683 411/39 |
| 6,209,175 B1 | * | 4/2001 | Gershenson | F16B 5/065 411/509 |

(Continued)

FOREIGN PATENT DOCUMENTS

| | | |
|---|---|---|
| DE | 202005011420 U1 | 10/2005 |
| DE | 102006057557 A1 | 6/2008 |

(Continued)

OTHER PUBLICATIONS

International Search Report dated Apr. 9, 2021 in corresponding application PCT/EP2021/050120.

*Primary Examiner* — Daniel J Wiley
(74) *Attorney, Agent, or Firm* — Muncy, Geissler, Olds & Lowe, P.C.

(57) ABSTRACT

A joining arrangement having a receiver and a ball joint, wherein the ball joint comprises a joint pin with a joint ball and comprises a joint socket for receiving the joint ball, and wherein the ball joint is spread open resiliently into the receiver. According to the invention, the receiver has a guide element with a guide region which extends in a guide direction, wherein the joint socket is, by means of at least two locking arms, spread open resiliently into the guide element in a preselectable setpoint position within the guide region.

7 Claims, 4 Drawing Sheets

(56) References Cited

U.S. PATENT DOCUMENTS

| | | | | |
|---|---|---|---|---|
| 6,592,244 | B2 * | 7/2003 | Christiansen | B60Q 1/068 411/72 |
| 6,837,716 | B1 * | 1/2005 | Brazas | F16C 11/0657 439/8 |
| 7,686,530 | B2 * | 3/2010 | Schilz | F16C 11/069 403/329 |
| 11,149,785 | B2 * | 10/2021 | Fladhammer | F16C 11/0623 |
| 2007/0031185 | A1 * | 2/2007 | Bertram | F16B 21/075 403/122 |
| 2019/0368535 | A1 * | 12/2019 | Recker | F16C 11/0685 |

FOREIGN PATENT DOCUMENTS

| | | |
|---|---|---|
| EP | 0859158 A1 | 8/1998 |
| EP | 1216881 A2 | 6/2002 |
| EP | 3299642 A1 | 3/2018 |

\* cited by examiner

JOINING ARRANGEMENT HAVING A RECEIVING MEANS AND A BALL JOINT

This nonprovisional application is a continuation of International Application No. PCT/EP2021/050120, which was filed on Jan. 6, 2021, and which claims priority to German Patent Application No. 10 2020 100 918.6, which was filed in Germany on Jan. 16, 2020, and which are both herein incorporated by reference.

BACKGROUND OF THE INVENTION

Field of the Invention

The present invention relates to a joining arrangement having a receiver and a ball joint, wherein the ball joint comprises a joint pin with a joint ball and comprises a joint socket for receiving the joint ball, and wherein the ball joint is spread open resiliently into the receiver. Furthermore, the invention relates to a ball joint for use in such a joining arrangement and to a method for mounting a light module on a support frame of a vehicle lighting device.

Description of the Background Art

A joint in which the joint head has a spherical shape is referred to as a ball joint, wherein the counterpart, which encloses the head to varying degrees depending on the joint, is called the joint socket. Due to this geometry, a ball joint can in principle be rotated in three axes, wherein translational movements are not possible. The joint head is designed, for example, as a joint ball on a cylindrical joint pin.

Ball joints are used, for example, in the assembly of vehicle lighting devices, where they are used, for instance, to attach a light module to a support frame. For this purpose, the joint pin is preferably designed as a ball screw which can be screwed to the light module to be mounted, and the joint socket is connected to the support frame, in particular resiliently spread open into a corresponding receiver, which is also referred to as an interface. As a result, the light module is locked in a desired position on the support frame, but remains pivotable due to the rotational degrees of freedom of the ball joint such that fine adjustment of the light module in relation to further optical components, for example, a lens, is possible in order to generate a desired light impression of the vehicle lighting device.

For example, EP 3 299 642 A1 discloses a vehicle headlight comprising a ball joint, a light module, and a support frame, wherein the ball joint connects the support frame to the light module or to a support unit located on the vehicle side, wherein the ball joint is rotatable in a longitudinal position.

In practice, during the assembly of such joining arrangements with a ball joint fixed in a receiver on the support frame side, the problem arises that due to manufacturing and/or assembly tolerances, the position of the receiver relative to other components of the lighting device is not always dimensionally accurate. In particular, if the assembly to be fixed, for example, a light module, has to be attached to the support frame via a plurality of receiver, such tolerances lead to major assembly difficulties or to rejection of components.

SUMMARY OF THE INVENTION

It is therefore an object of the present invention to provide a refinement of a joining arrangement with a ball joint resiliently spread open into a receiver, as well as an associated assembly method, wherein in particular the possibility of compensating for manufacturing and/or assembly tolerances is provided.

The invention includes the technical teaching that the receiver has a guide element with a guide region which extends in a guide direction, wherein the joint socket is, by means of at least two locking arms, spread open resiliently into the guide element in a preselectable setpoint position within the guide region.

The invention is based on the idea of ensuring a movability of the joint socket within the receiver by means of the guide element, so that dimensional tolerances can be compensated for during the assembly of the joining arrangement. The locking arms serve to guide the joint socket during movement within the guide element, and it is only when the joint pin with the joint ball is inserted into the joint socket that a clamping connection is established between the joint socket and the receiver via the locking arms and the ball joint is thus fixed in a dimensionally accurate setpoint position. In addition to the possibility of compensating for tolerances, the positionability of the assembly mounted on the ball joint, for example, a light module, can also be expanded in principle, which now has an additional translational degree of freedom in addition to the ability to pivot via the ball joint.

In an advantageous embodiment of the joining arrangement of the invention, the guide element can have a receiving opening with an elongated extension to form the guide region, for example, in the form of an elongated hole. The joint socket can be moved along the guide direction in such a receiving opening, wherein the orientation of the receiving opening in the component comprising the interface, for instance, a support frame, can be suitably selected. For example, if two interfaces are provided, the two associated receiving openings can expediently extend along a common straight line.

Preferably, the joint socket comprises at least one positioning rib by means of which rotation of the joint socket against the guide element can be prevented. Such a positioning rib is particularly useful during the assembly of the joining arrangement, during which the joint socket is moved within the guide element.

The invention further relates to a ball joint for an above-described joining arrangement, wherein the joint socket of the ball joint comprises at least two resilient tongues which extend from an outer sleeve of the joint socket into a ball joint receiving opening, and wherein the joint ball can be assembled with the joint socket by means of a resilient spreading open of the resilient tongues. In addition, in an advantageous embodiment, the joint socket comprises at least one support web, which is arranged or formed on the outer sleeve and forms a socket bearing at least in sections. Furthermore, the locking arms preferably form a socket bearing at least in sections.

The joint pin can be designed as a ball screw and is thus suitable for establishing a detachable connection with a component, for example, a light module.

The invention furthermore relates to a method for mounting a light module on a support frame of a vehicle lighting device, wherein the method comprises at least the following steps: providing a support frame having a receiver, wherein the receiver has a guide element having a receiving opening with an elongated extension to form a guide region, providing a joint pin and joint socket to form a ball joint, inserting the joint socket into the guide element, moving the joint socket along a guide direction within the guide region to a setpoint position, inserting the pivot pin into the joint socket to form a joining arrangement, and connecting the joint pin to the light module.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3b shows a perspective view of the joining arrangement from FIG. 3a.

DETAILED DESCRIPTION

Figure 1A:
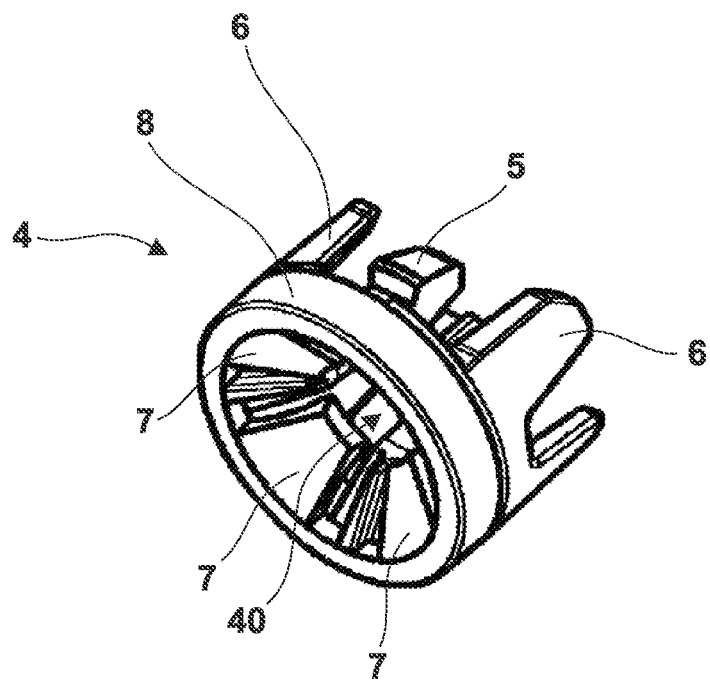
FIGS. 1a to 1d show perspective views of a joint socket of a ball joint of the invention.
Figure 1B:
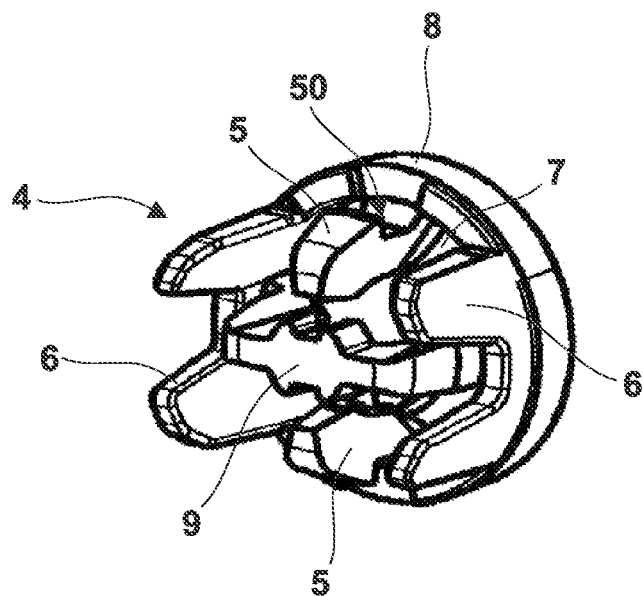
Figure 1C:
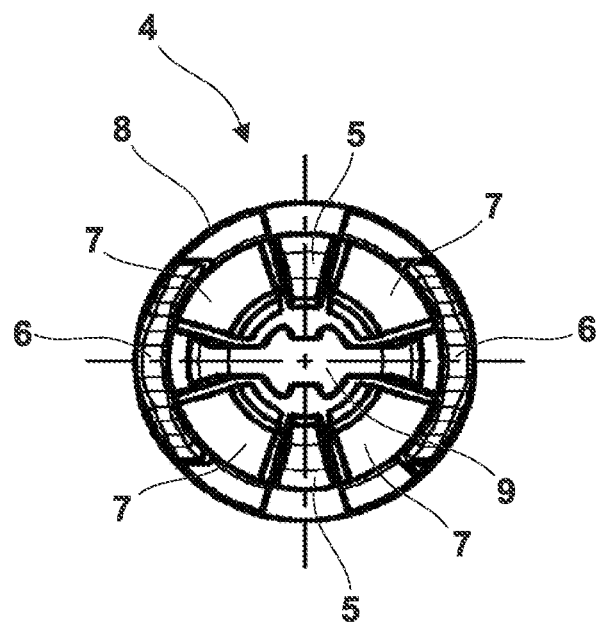
Figure 1D:
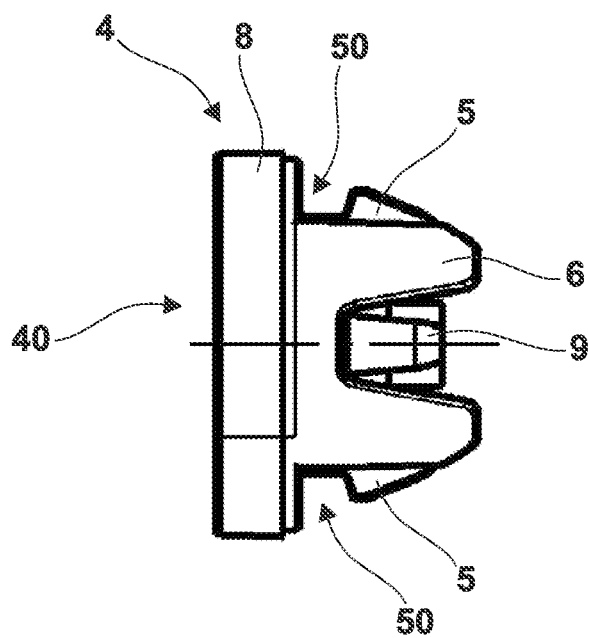

FIGS. 1a to 1d show perspective views of a joint socket 4 of a ball joint of the invention, which comprises annular outer sleeve 8 from which four resilient tongues 7 extend in the direction of joint ball receiving opening 40, wherein two locking arms 5, two U-shaped positioning ribs 6, and support web 9 project in the rearward direction from outer sleeve 8. Joint socket 4 is formed of, for example, of a thermoplastic, for instance, polyoxymethylene (POM), and is advantageously manufactured by means of an injection molding process.

The two locking arms 5 each have a notch 50 on the outside for receiving a guide element of a receiver, and a concavely curved surface section on the inside, which serves to form a socket bearing for a joint ball. The socket bearing is further formed by the surface sections of support web 9, which are concavely curved on the inside. To assemble the ball joint, a joint pin with a joint ball is inserted into joint ball receiving opening 40, wherein the four resilient tongues 7 are resiliently spread open and contact the joint ball at the end face after complete insertion. Resilient tongues 7 thus secure the joint ball against being pulled out of joint ball receiving opening 40, wherein socket bearings formed by the corresponding sections of locking arms 5 and support web 9 ensure a rotatable mounting of the joint ball. By inserting a joint ball into joint socket 4, locking arms 5 are also resiliently spread open, so that a clamping connection to a guide element received in notches 50 can thereby be established.

Figure 2:
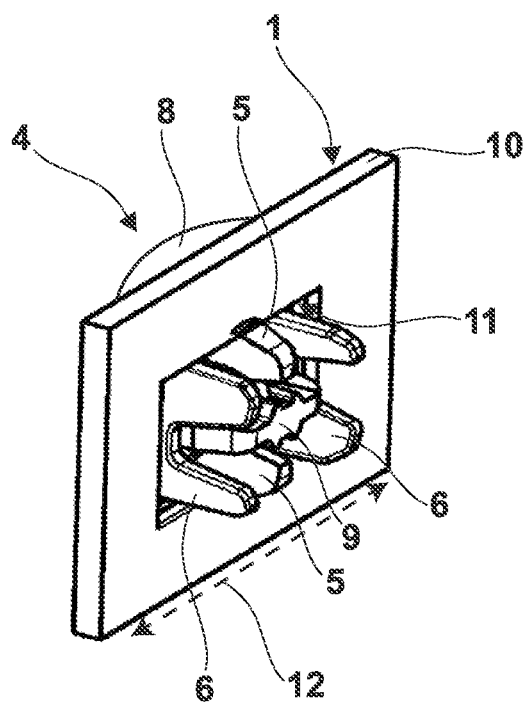
FIG. 2 shows a perspective view of a joint socket in a receiver as part of a joining arrangement of the invention.

FIG. 2 shows a perspective view of a joint socket 4 of a ball joint of the invention received in guide element 10 of a receiver 1, wherein guide element 10 is formed with an elongated receiving opening to form guide region 11. In the arrangement shown without the joint pin inserted, joint socket 4 is not yet fixedly engaged in guide element 10, but can be moved laterally along guide direction 12 in guide region 11, which results in the possibility of tolerance compensation according to the invention. Within the scope of the method of the invention for mounting a light module on a support frame of a vehicle lighting device, wherein the light module is provided for mounting on one or more ball joints and a corresponding number of receiver 1 are part of the support frame, a mounting for the light module in a production-related setpoint position can be realized by such lateral fine positioning of joint socket 4. In particular, when the light module is mounted on a plurality of ball joints, this ensures stress- and distortion-free assembly.

For example, the width of guide region 11 can be made 5 mm wider than the outer diameter of outer sleeve 8 of joint socket 4. During lateral movement of joint socket 4 in guide region 11, guide element 10 is received in notch 50 on the two locking arms 5, and positioning ribs 6 additionally ensure that no undesired rotation of joint socket 4 occurs during movement.

After joint socket 4 has been brought into its setpoint position, the arrangement is fixed in place by engaging a ball screw in joint socket 4 as part of the assembly process of the invention, wherein a clamping connection between joint socket 4 and guide element 10 is achieved by means of the resilient spreading of the two locking arms 5.

Figure 3A:
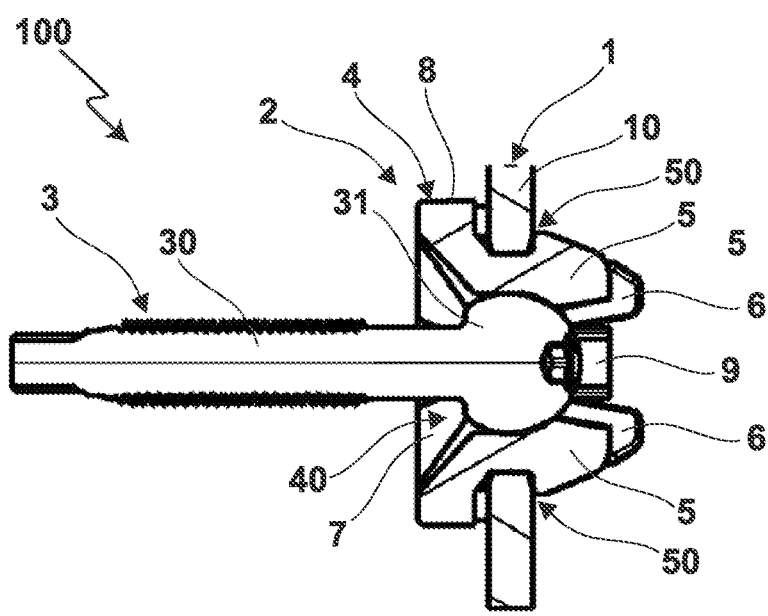
FIG. 3a shows a cross-sectional view of a joining arrangement of the invention.
Figure 3B:
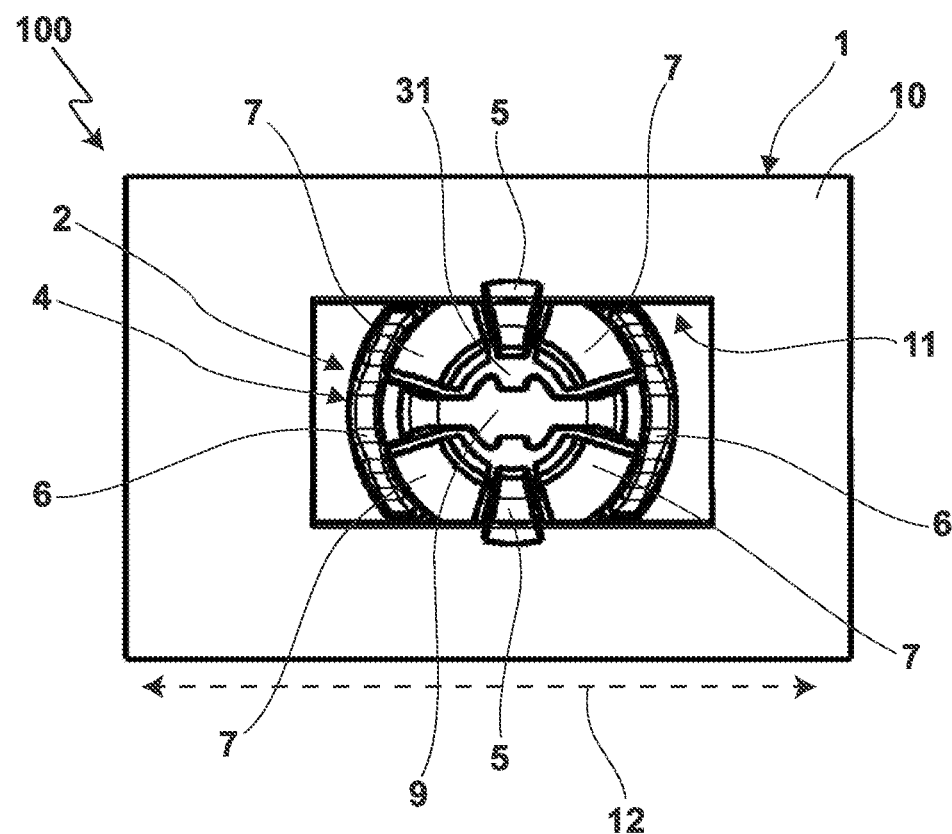

FIGS. 3a and 3b show a cross-sectional view and a rear view, respectively, of the entire joining arrangement 100 of the invention with ball joint 2 in the arrangement in receiver 1. Ball joint 2 is located here in a setpoint position centrally within guide region 11, wherein a horizontal movement along guide direction 12 precedes the adjustment into this setpoint position. Joint pin 3 is designed here by way of example as a ball screw 30, the head of which represents joint ball 31. Joint ball 31 spreads the two locking arms 5 apart, which results in a clamping connection between ball joint 2 and guide element 10 received in the two notches 50. Resilient tongues 7 form contact surfaces with joint ball 31 and thus prevent an axial pulling out of ball screw 30 from joint socket 4. The contact surfaces between resilient tongues 7 and joint ball 31, together with corresponding sections of the two locking arms 5 and support web 9, form the socket bearing in which ball screw 30 is rotatably mounted.

The invention is not limited in its implementation to the preferred exemplary embodiment described above. Rather, a number of variants are conceivable which make use of the shown solution even in the case of fundamentally different embodiments. All features and/or advantages arising from the claims, the description, or the drawings, including structural details, spatial arrangements, and method steps, can be essential to the invention both individually and in a wide variety of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A joining arrangement comprising:
   a receiver; and
   a ball joint that comprises a joint pin with a joint ball and comprises a joint socket for receiving the joint ball,
      wherein the ball joint is spread open resiliently into the receiver,
      wherein the receiver has a guide element with a guide region that extends in a guide direction,
      wherein the joint socket is, via at least two locking arms, spread open resiliently into the guide element in a preselectable setpoint position transverse to the guide direction within the guide region; and wherein the joint socket comprises at least one positioning rib on a side of the locking arms along the guide direction, by means of which rotation of the joint socket against the guide element is prevented.

2. The joining arrangement according to claim 1, wherein the guide element has a receiving opening with an elongated extension to form the guide region.

3. A ball joint for a joining arrangement according to claim 1, the joint socket comprises at least two resilient tongues that extend from an outer sleeve of the joint socket into a joint ball receiving opening, and the joint ball is adapted to be assembled with the joint socket via a resilient spreading open of the resilient tongues.

4. The ball joint according to claim 3, wherein the joint socket comprises at least one support web, which is arranged or formed on the outer sleeve and forms a socket bearing at least in sections.

5. The ball joint according to claim 3, wherein the locking arms form a socket bearing at least in sections.

6. The ball joint according to claim 3, wherein the joint pin is a ball screw.

7. A method for mounting a light module on a support frame of a vehicle lighting device using the joining arrangement of claim 1, the method comprising:

providing a support frame having a receiver, wherein the receiver has a guide element having a receiving opening with an elongated extension to form a guide region;

providing a joint pin and joint socket to form a ball joint;

inserting the joint socket into the guide element;

moving the joint socket along a guide direction within the guide region to a setpoint position;

inserting the pivot pin into the joint socket to form a joining arrangement; and connecting the joint pin to the light module.

* * * * *